May 13, 1952     G. B. WATKINS ET AL     2,596,515

COATING VITREOUS SUBSTANCES

Filed March 14, 1946

INVENTORS
GEORGE B. WATKINS
ROMEY A. GAISER

BY Frank Fraser

ATTORNEY

Patented May 13, 1952

2,596,515

UNITED STATES PATENT OFFICE 2,596,515

COATING VITREOUS SUBSTANCES

George B. Watkins and Romey A. Gaiser, Toledo, Ohio, assignors to Libbey-Owens-Ford Glass Company, Toledo, Ohio, a corporation of Ohio Application March 14, 1946, Serial No. 654,389

8 Claims. (Cl. 204—30)

1

This invention relates to the application of metallic coatings, and more particularly to the electroplating of metals onto normally non-conducting surfaces.

The invention is particularly valuable in connection with the coating of vitreous substances. Glass itself, for example, is the best all purpose, transparent material known; but, in its normal solid state, it is such a poor conductor of electricity that it is widely used as an electrical insulating material. For this reason, it has never before been possible to electroplate metals directly onto glass.

According to the present invention, however, a metallic coating is electrolytically deposited on a glass surface by first treating the surface in a manner that will render it electrically conducting, but without noticeably affecting its appearance, and then electroplating a layer of metal onto this treated surface.

Specifically, the preelectroplating treatment consists in exposing a glass surface, while it is at a temperature approximating its point of softening, to the chemical action of a tin halide. The exposure is continued for a sufficient length of time to render the surface electrically conducting, but is preferably discontinued before any color or noticeable film appears.

An important object of the invention is to produce a smooth, bright, uniform coating of metal on a vitreous surface; which coating is much more stable and tightly adherent than metallic coatings of similar characteristics that are produced by prior known methods.

Another object is the provision of a novel coating technique by means of which a metallic coating can, in effect at least, be electroplated directly onto a glass surface.

Other objects and advantages of the invention will become more apparent during the course of the following description, when taken in connection with the accompanying drawings.

In the drawings, wherein like numerals are employed to designate like parts throughout the same:

2

Figure 1:
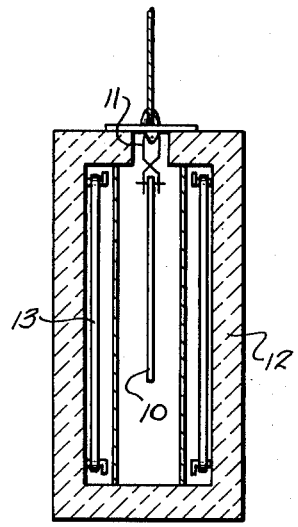
Fig. 1 is a vertical sectional view through a furnace for heating vitreous articles.

One of the outstanding uses of the invention is its application to coating transparent glass sheets or plates with bright metals, and it will be described in that connection here. Apparatus suitable for the purpose has been illustrated in the drawings and a preferred method of procedure is described below.

A glass sheet to be coated is first thoroughly cleaned, after which it is ready for the preliminary or preplating treatment. As indicated above, this treatment involves the chemical reaction of a tin halide on hot glass and may be carried out in a number of different ways. One of the simplest ways, and one which gives very good results, consists in first heating the glass sheet and then exposing it to the action of the vapors of stannic tetrachloride.

This particular treatment is described in detail in a copending application in the names of Romey A. Gaiser and Harold A. McMaster, Serial No. 513,144, filed December 6, 1943 and now abandoned. In carrying out the treatment, a cleaned glass sheet 10, which may be hung from tongs 11 to facilitate handling, is introduced into a furnace 12, heated by electrical resistance elements 13 or the like, and there brought up to a temperature that is substantially that of the softening point of the glass.

Because glass varies and has no precise softening point, it is not practicable to give any exact temperature requirements; but, in securing colorless, transparent, electrically conducting surfaces on average glass, we have found that exposure to temperatures between 550 degrees centigrade to 700 degrees centigrade for from two to ten minutes, followed immediately by the chemical treatment, gives very satisfactory results.

The temperature and time factors are influenced by the type of glass, running higher as the softening point of the glass rises. For instance, a soft, high soda, soda-lime-silica glass may be heated for approximately two minutes at about 550 degrees centigrade, while a borosilicate glass requires something like six minutes at 700 degrees centigrade, before being exposed to the filming stage of the treatment. Generally speaking, in order to produce satisfactory and consistent results, the glass should be heated sufficiently to be relieved of strains without change of dimensions or contour.

Figure 2:
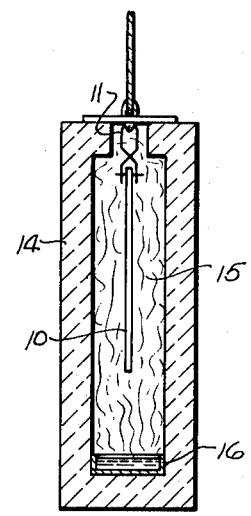
Fig. 2 is a vertical section taken through a chamber in which a heated, vitreous article can be exposed to the fumes of a tin halide.

After proper heating, the sheet 10 is removed from the furnace and introduced into the chamber 14 (Fig. 2) where it is exposed to the fumes or vapors 15 of the tin halide. As stated above, the compound preferred for use in the chemical treatment of the glass is stannic tetrachloride (SnCl₄). The advantage of stannic tetrachloride is that it is a mobile liquid of relatively high vapor pressure at normal temperatures. Consequently, by simply pouring a sufficient quantity of it into a container 16 in the bottom of the chamber 14, the atmosphere within the chamber will quickly become saturated with the vapors of the volatile compound.

As disclosed by Romey A. Gaiser, one of the present applicants, in an application filed March 14, 1946, Serial No. 654,474, suitable vapors for this same purpose can also be obtained from stannic tetrabromide and stannic tetraiodide. However, because these latter compounds are normally solids, it is necessary to heat them to a point where they melt into liquids with an appreciable vapor pressure, and to maintain them at this temperature, in order to provide a satisfactory fuming atmosphere.

In any event, regardless of the source of the halide vapors, the hot glass article from the oven 10 is suspended in the saturated atmosphere of the chamber 14 and moved gently back and forth, by hand or suitable mechanism (not shown), for a period of time varying from four to twelve seconds. The average time is about six seconds, but at any rate the glass should be exposed to the stannic halide vapors for a sufficient length of time to secure an electrically conducting surface, but not long enough to permit it to become cloudy, foggy or colored.

After removal from the chamber 14, the treated sheet is usually allowed to cool in the air at normal room temperature. When the glass is in the region of its softening point at the time that it is removed from the furnace, no breakage will result from this type of cooling. If desired, the hot, treated glass may be annealed more slowly, but this has been found to reduce its electrical conductivity. Conversely, however, when it is suddenly chilled upon removal from the chamber 14, in order to temper it by placing its outer surfaces under compression and the interior under tension, excellent results are obtained.

When it is desired to coat one side only of a glass sheet with metal, for example in the making of mirrors, it is preferable to make only one surface or side electrically conducting. This can be readily accomplished by protecting the opposite side, or selected portions of the glass surfaces, from the action of the stannic halide vapors during the fuming step of the preplating treatment. A readily removable shielding material is desirable for the purpose; and practically any solid, insoluble substance which has a melting point higher than the softening point of the glass, and which will not react with either the vapors or the glass, can be used.

In actual commercial production we prefer to spray onto the surfaces to be protected a mixture of varcel (diatomaceous earth) in water and/or alcohol. Other materials which can be used include: whiting, bentonite, titanium dioxide, fuller's earth, etc. Still another method of protecting one side of a glass sheet from the action of the vapors is to place two plates of glass together so that the vapors come in contact with the two outside surfaces only.

Although we prefer to render the surface of the glass electrically conducting by fuming it with stannic halide vapors, good results can also be obtained by dipping the glass to be treated in a solution of a tin halide, or by spraying the solution on the glass surface, as described in detail in another application of Romey A. Gaiser, Serial No. 654,473, filed March 14, 1946. As explained there, the dipped or sprayed glass is preferably heated to approximately its point of softening after the solution has been applied to its surface. But, in any event, the basic treating idea is always the same; namely, the chemical action of a tin halide in contact with a hot glass surface.

Just what the chemical action is that takes place at the glass-air interface in this preelectroplating treatment, is not completely understood. But all of our experiments tend to show that it is the presence of stannic oxide that is responsible for the newly acquired electrically conducting property of the treated surface. This is rather surprising because stannic oxide itself is considered to have an extremely high electrical resistance.

However, regardless of the exact reaction or the final reaction product, this particular characteristic of a glass article that has been treated in the manner described above undergoes a surprising change. To the eye of an ordinary observer the treated sheet looks exactly like it did before. But, when the electrical resistance of the treated surface is measured it will be found to have decreased from a million megohms, or 1,000,000,000,000 ohms, per square area at 50% humidity, for the untreated glass, to anywhere from 10,000 to 100,000 ohms for the treated surface.

The electrical resistance of the treated surface decreases as the time of exposure to the stannic halide fluid, whether as a vapor or in liquid form, increases; and practically invisible surfaces which have a coefficient of electrical resistance as low as 30,000 ohms may be produced because, by proper handling, the electrical conductivity of a surface can be increased to this point before any noticeable color, fogging or decrease in transparency appears in the glass.

As soon as a glass article has been given the preplating treatment, it is possible to electroplate metals onto the treated surface in the conventional manner. However, the metallic coatings so formed are not entirely satisfactory because the plate will start to form at the edge of the glass to which the contact is made, and will build up around the edges and then toward the center, the center plating last. As a consequence, the formed metal film is non-uniform in thickness and may subsequently peel or lift off the glass.

All this results from the fact that the electrical resistance of the treated glass is not of the same order as is encountered with metals. To illustrate, if a 10 x 10 inch plate of glass which has been treated to render one surface electrically conducting shows a resistance per square area of 1,000 ohms, then a strip one inch long and 10 inches wide would have a total resistance of 100 ohms. This explains why, with conventional methods, the plating occurs first at the edge where contact to the electrical source is made.

We have discovered, however, that we can take advantage of the very conditions that cause difficulty when conventional electroplating procedure is used, to produce a coating of perfectly uniform thickness on a glass sheet. Broadly stated, this is accomplished by progressively shifting the relative positions of the sheet and the electrolytic bath during plating so that the glass sheet is completely immersed at the beginning of the operation and entirely out of the plating bath at the end. One method of doing this is by lifting the glass plate slowly out of the bath as it is plated, and another is by slowly lowering the level of the bath. These two methods are illustrated in Figs. 3 and 4 respectively.

Figure 3:
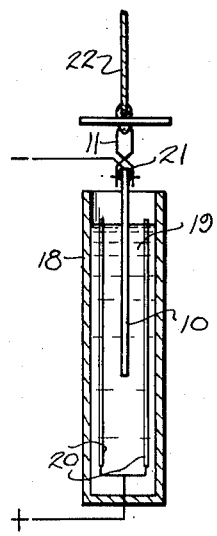
Fig. 3 is a sectional view through an electrolytic or electroplating tank, within which the fumed article can be electroplated.
Figure 4:
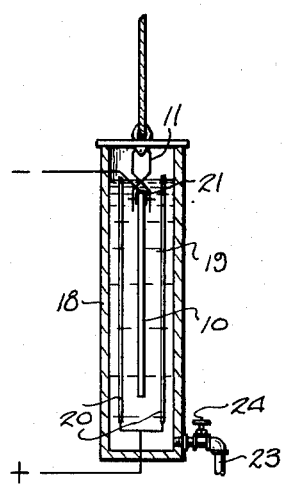
Fig. 4 is a view similar to Fig. 3, but showing an attachment on the electroplating tank for improving the uniformity of the coating.

The plating apparatus of Fig. 3 comprises an electrolytic tank 18 containing a suitable electrolyte 19. Arranged in the electrolytic bath are the usual anodes 20, preferably in the form of plates and of the same metal as contained in the electrolyte 19. The cathode element 21 runs along the upper edge of the glass sheet 10 and is held in place by the tongs 11.

The plating begins in the usual manner with the glass sheet submerged in the bath but, as the plating proceeds, the sheet is raised out of the bath by any suitable lifting mechanism working through the cable 22. The lifting speed can be adjusted by visual inspection of the forming metal plate. Or, if desired, an electric motor can be connected in series with the bath and the mechanical lifting device so that as the resistance of the glass surface increases, the speed of lifting decreases and vice versa.

Plating baths of standard composition or slightly modified can be successfully used with this method. A copper plating bath which gives very good results is:

20 g./l. $Cu_2(Cn)_2$
35 g./l. NaCn
15 g./l. $Na_2CO_3$
60 g./l. $KH_4H_4O_6$
C. D. .4 A./sq. ft. room temperature A nickel bath that works well is:

200 g./l. $NiSO_4 \cdot 6H_2O$
45 g./l. $NiCl_2 \cdot 6H_2O$
30 g./l. $H_2BO_3$
10 g./l. gelatin
3 drops 10% "Aerosol" (N-octadecyl disodium sulfosuccinamate) sol./liter
C. D. 10 A./sq.ft. 40–50 C.

In addition to copper and nickel, coatings of silver, chromium, iron and rhodium have been electroplated on glass in a similar manner.

Instead of lifting the glass from the bath as shown in Fig. 3, like results can be obtained by slowly draining the electrolyte from the tank 18 as shown in Fig. 4. For this purpose there is provided a drain pipe 23 leading to a storage tank (not shown). The speed at which the level of the bath falls may be controlled by a valve 24 operated either by hand or by an electric motor connected in series in the manner outlined above. Other ways of lowering the level of the electrolyte are by syphoning, or by moving the tank 18 downwardly.

Regardless of the manner in which the relative positions of the glass and plating bath are shifted, or the particular composition of plating bath, the electroplating method of this invention produces metal plates on glass surfaces that are not only remarkably uniform, but are also durable, bright and have excellent adhesion to the glass.

One important use of the invention is in the making of glass mirrors. A highly reflective coating that is much more permanent than one resulting from the usual vacuum deposition, chemical deposition, or spraying, can be produced in this way. At the same time, since the coating of the invention is electroplated onto the glass with no apparent interfering film or coating between it and the glass, the resultant mirror can be used for second surface, as well as for first surface reflection.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

We claim:

1. A method of coating a surface of a glass article with metal, comprising treating said surface by exposing it while at a temperature in the neighborhood of its softening point to the chemical action of a tin halide in fluid form in contact therewith, placing the treated surface as a cathode in an electroplating bath opposite a stationary anode having a surface area coextensive with the entire area of said treated surface, and causing a metallic coating to be continuously formed on the treated surface at the line of juncture of said surface and the surface of the electroplating bath by lowering the surface of the electroplating bath while the metallic coating is forming on the surface of the glass article until said article is entirely out of said bath and a uniform coating has been deposited.

2. A method of coating a vitreous article with metal, comprising heating a surface of said article to substantially its point of softening, exposing said heated surface to the chemical action of a tin halide to form a transparent, electrically conducting film thereon, and then electroplating a layer of metal directly onto the treated surface of the vitreous article.

3. A method of producing second surface mirrors, comprising heating a surface of a transparent sheet of glass to substantially its point of softening, exposing said heated surface to the chemical action of a tin halide to form a transparent electrically conducting film thereon, and then electroplating a layer of reflecting metal directly onto the treated surface so that it is visible through the transparent glass sheet.

4. A method of coating a surface of a glass article with an electroplate, comprising treating said surface by exposing it while at a temperature in the neighborhood of its softening point to the chemical action of a tin halide in fluid form in contact therewith, placing the treated surface as a cathode in an electroplating bath opposite a stationary anode, and causing a metallic coating to be continuously formed on the treated surface at the line of juncture of said surface and the surface of the electroplating bath by progressively shifting the relative positions of the upper surface of the electroplating bath and the surface being plated during the plating operation in timed relation to the formation of the metallic coating until said coating has been completely formed and said surface is entirely out of said bath.

5. A method of coating a surface of a glass article with metal, comprising treating said surface by exposing it while at a temperature in the neighborhood of its softening point to the chemical action of a tin halide in fluid form in contact therewith, placing the treated surface as a cathode in an electroplating bath opposite a stationary anode, and causing a metallic coating to be continuously formed on the treated surface at the line of juncture of said surface and the surface of the electroplating bath by moving the surface being plated through and out of the bath while the metallic coating is forming thereon until said surface is entirely out of said bath and a uniform coating has been deposited.

6. A vitreous article having a transparent electrically conducting coating of tin oxide on a surface thereof, and a metal electroplate more durable and more tightly adherent than a chemically deposited, a vacuum deposited or a sprayed metallic coating on said coated surface.

7. A new article of manufacture comprising a transparent glass body, a transparent electrically conducting coating of tin oxide on a surface of said body, and a smooth bright metal electroplate more durable and more tightly adherent than a chemically deposited, a vacuum deposited or a sprayed metallic coating on said coated surface and visible through said body from another surface thereof.

8. A second surface mirror, comprising a transparent glass sheet, a reflecting metal electroplate more durable and more tightly adherent than a chemically deposited, a vacuum deposited or a sprayed metallic coating on one surface only thereof and visible therethrough from another surface thereof, and a transparent, electrically conducting coating of tin oxide between said electroplate and said glass sheet.

GEORGE B. WATKINS.
ROMEY A. GAISER.

REFERENCES CITED

The following references are of record in the file of this patent:

UNITED STATES PATENTS

| Number | Name | Date |
|---|---|---|
| 1,304,844 | Barnes | May 27, 1919 |
| 1,335,174 | Merritt | Mar. 30, 1920 |
| 1,772,074 | Engelhardt et al. | Aug. 5, 1930 |
| 2,103,538 | Kolb | Dec. 28, 1937 |
| 2,118,795 | Littleton | May 24, 1938 |
| 2,290,911 | Jones | July 28, 1942 |
| 2,303,871 | Walker | Dec. 1, 1942 |
| 2,304,182 | Lang | Dec. 8, 1942 |
| 2,345,356 | Owen | Mar. 28, 1944 |
| 2,394,930 | McRae | Feb. 12, 1946 |
| 2,424,583 | Rahm | July 29, 1947 |
| 2,429,420 | McMaster | Oct. 21, 1947 |
| 2,430,581 | Pessel | Nov. 11, 1947 |
| 2,482,054 | Colbert | Sept. 13, 1949 |

FOREIGN PATENTS

| Number | Country | Date |
|---|---|---|
| 275,223 | Great Britain | Mar. 1, 1928 |